BENJAMIN T. BABBITT.
Improvement in the Manufacture of Soap.
No. 127,828.                               Patented June 11, 1872.
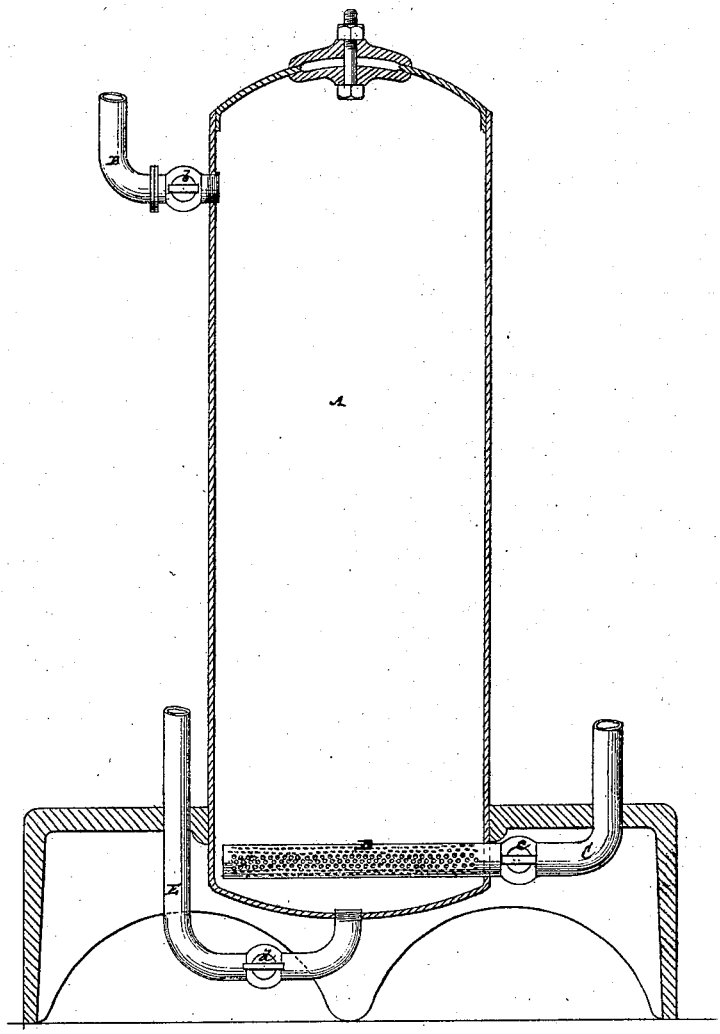

127,828

UNITED STATES PATENT OFFICE.

BENJAMIN T. BABBITT, OF NEW YORK, N. Y.

IMPROVEMENT IN THE MANUFACTURE OF SOAPS.

Specification forming part of Letters Patent No. 127,828, dated June 11, 1872.

*To all whom it may concern:*

Be it known that I, BENJAMIN T. BABBITT, of the city, county, and State of New York, have invented a new and useful Improvement in the Manufacture of Soap; and I do hereby declare that the following is a full, clear, and exact description of the same, reference being had to the accompanying drawing forming part of this specification, and which represents a sectional elevation of an apparatus in illustration of my improvement.

My invention relates to the manufacture of soap under heat and pressure; and consists in a novel process of boiling soap by means of an apparatus composed of a close vessel in which the oils or fatty matters, and lye to produce saponification, are inserted by a suitable inlet at or near its top, a perforated steam-distributer arranged within said vessel at or near its bottom for the introduction of simple or superheated steam direct among the ingredients for the purpose of heating and agitating the mass, and a lower pipe or outlet for discharging the contents of the vessel, and which may be done under pressure.

Referring to the accompanying drawing, A represents a closed vessel, into which the lye and oil or grease are introduced by an upper pipe, B, provided with a stop-cock, *b*. C is a pipe for conveying simple or superheated steam to a perforated distributer, D, arranged within said vessel at or near its bottom, said pipe C being provided with a stop-cock, *c*. E is a delivery-pipe having a cock, *d*, and connected with the bottom of the vessel A for discharging the contents of the latter when required, and which may be done under pressure of the steam introduced by the pipe C and distributer D.

In the operation of the apparatus the introduction of steam in jets among the mass, at or near its bottom, for circulation up through the same, when restricted to a close vessel containing said mass, effects such a perfect heating and agitation, or thorough mixing of the ingredients, as is not attainable by an open vessel, dispenses with stirrers, and retains all the advantages of boiling under pressure.

What is here claimed, and desired to be secured by Letters Patent, is—

The process, substantially as herein described, of making soap under pressure by means of a perforated steam-distributer, arranged within the lower portion of a close vessel in which the mass to be heated is deposited, for effecting the agitation, in the manner described.

B. T. BABBITT.

Witnesses:
   FRED. HAYNES,
   FERD. TUSCH.